United States Patent
Wang et al.

(10) Patent No.: US 11,766,640 B2
(45) Date of Patent: Sep. 26, 2023

(54) METHOD FOR PREPARING BLOCK COPOLYMER HOLLOW FIBER MEMBRANE BY MELT SPINNING-STRETCHING AND SELECTIVE SWELLING

(71) Applicant: NANJING TECH UNIVERSITY, Jiangsu (CN)

(72) Inventors: Yong Wang, Jiangsu (CN); Dinglei Zhong, Jiangsu (CN); Jiemei Zhou, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/001,092

(22) PCT Filed: Mar. 23, 2022

(86) PCT No.: PCT/CN2022/082365
§ 371 (c)(1),
(2) Date: Dec. 8, 2022

(87) PCT Pub. No.: WO2022/199592
PCT Pub. Date: Sep. 29, 2022

(65) Prior Publication Data
US 2023/0191336 A1    Jun. 22, 2023

(30) Foreign Application Priority Data
Mar. 24, 2021    (CN) .......................... 202110313177.7

(51) Int. Cl.
| | | |
|---|---|---|
| B01D 67/00 | (2006.01) | |
| B01D 71/52 | (2006.01) | |
| B01D 69/08 | (2006.01) | |
| B01D 71/68 | (2006.01) | |
| B01D 71/80 | (2006.01) | |
| D01D 5/24 | (2006.01) | |
| D01F 1/08 | (2006.01) | |

(52) U.S. Cl.
CPC ....... B01D 67/0027 (2013.01); B01D 67/002 (2013.01); B01D 69/08 (2013.01); B01D 71/5211 (2022.08); B01D 71/68 (2013.01); B01D 71/80 (2013.01); D01D 5/24 (2013.01); D01F 1/08 (2013.01)

(58) Field of Classification Search
CPC .... D01F 1/08; D01D 5/24; B01D 69/08–088; B01D 67/0027; B01D 67/002; B01D 71/5211; B01D 71/68; B01D 71/80
See application file for complete search history.

(56) References Cited

U.S. PATENT DOCUMENTS

| | | |
|---|---|---|
| 5,294,338 A | 3/1994 | Kamo et al. |
| 10,080,996 B2 * | 9/2018 | Berzinis ............... B01D 63/021 |
| 2017/0036169 A1 * | 2/2017 | Berzinis ............... B01D 69/08 |
| 2019/0209973 A1 * | 7/2019 | Widjojo ............... B01D 71/68 |
| 2020/0023322 A1 * | 1/2020 | Hikita ............... B01D 65/08 |

FOREIGN PATENT DOCUMENTS

| | | |
|---|---|---|
| CN | 106087453 A | 11/2016 |
| CN | 109316971 A | 2/2019 |
| CN | 111318174 A | 6/2020 |
| CN | 113041848 A | 6/2021 |
| GB | 1278948 A | 6/1972 |
| GB | 1449644 A | 9/1976 |

OTHER PUBLICATIONS

International Search Report (with English translation) and Written Opinion issued in PCT/CN2022/082365, dated Jun. 7, 2022, 11 pages provided.
Office Action issued in corresponding Chinese Application No. 202110313177.7, dated Jul. 12, 2022, with English translation.
Notice of Grant issued in corresponding Chinese Application No. 202110313177.7, dated Aug. 25, 2022, with English translation.
Zhang et al., "Simultaneous zwitterionization and selective swelling-induced pore generation of block copolymers for antifouling ultrafiltration membranes", Journal of Membrane Science, vol. 599, Apr. 1, 2020.
Zhou et al., "Nanoporous block copolymer membranes immobilized with gold nanoparticles for continuous flow catalysis", Polymer Chemistry, Polym, Chem, 2019, 10, pp. 1642-1649.
Zhou et al., "Synthesis of poly(2-dimethylaminoethyl methacrylate)-block- poly(styrene-alt-N-phenylmaleimide) and its thermo-tolerant nanoporous films prepared by selective swelling", Polymer, vol. 164, Feb. 15, 2019, pp. 126-133.
Zhong et al.,"Selective swelling of block copolymer ultrafiltration membranes for enhanced water permeability and fouling resistance", Journal of Membrane Science, vol. 558, Jul. 15, 2018, pp. 106-112.

* cited by examiner

Primary Examiner — Jeffrey M Wollschlager
(74) Attorney, Agent, or Firm — HAMRE, SCHUMANN, MUELLER & LARSON, P.C.

(57) ABSTRACT

The disclosure provides a method for preparing a hollow fiber membrane by melt spinning-stretching and selective swelling, including: preparing a nascent hollow fiber by melt spinning in an inert gas protective atmosphere by using an amphiphilic block copolymer as a film forming material, and stretching the nascent hollow fiber in the cooling process, a stretch rate being controlled at 200-540 mm/min, and a stretch ratio being controlled at 150-600%; immersing the obtained hollow fiber in a swelling solvent, and treating the hollow fiber in a water bath at 65° C. for 1 h; and then transferring the hollow fiber into a long-chain alkane solvent, treating the hollow fiber at the same temperature for 1-12 h, and after the completion of the treatment, immediately taking out the hollow fiber and drying the hollow fiber to obtain the hollow fiber membrane with a bicontinuous porous structure. By combining the melt spinning-stretching and the selective swelling, the method of the disclosure can synchronously and continuously improve the permeability and selectivity of the hollow fiber membrane. The treatment in the long-chain alkane solvent can make the polar chain excessively enriched on the surface of the membrane migrate inward, thereby improving the performance of the hollow fiber membrane.

15 Claims, 1 Drawing Sheet

METHOD FOR PREPARING BLOCK COPOLYMER HOLLOW FIBER MEMBRANE BY MELT SPINNING-STRETCHING AND SELECTIVE SWELLING

TECHNICAL FIELD

The disclosure belongs to the technical field of porous separation membrane, and in particular relates to a method for preparing a block copolymer hollow fiber membrane based on selective swelling.

BACKGROUND

A hollow fiber membrane is a self-supporting membrane having a fibrous shape. The hollow fiber membrane, due to its advantages of high packing density per unit volume, simple operation and stable structure, is widely used in water treatment, catalytic reaction, food processing, biotechnology and medical technology.

At present, there are 3 main methods for preparing a hollow fiber membrane from a polymer material: melt spinning-cold stretching (MSCS), thermally induced phase separation (TIPS) and non-solvent induced phase separation (NIPS). In order to improve the performance of the hollow fiber membrane, a typical method is to stretch the nascent hollow fiber membrane in the preparation process. However, the hollow fiber membrane obtained from the above methods exhibits a typical trade-off, i.e., the increase inpermeance by stretching is always accompanied by the significant decrease in rejection. As the stretch ratio increases, the rejection performance of the hollow fiber membrane decreases more seriously, eventually affecting the application of the hollow fiber membrane.

Therefore, it is necessary to provide a method to avoid the decrease in rejection of hollow fiber membrane after stretching.

SUMMARY

In order to overcome the defects and shortcomings in the prior art, the disclosure provides a method for preparing a hollow fiber membrane by melt spinning-stretching and selective swelling. With this method, the hollow fiber membrane can be obtained by using a small amount of solvent, and the pore structure and the performance of the hollow fiber membrane can be continuously controlled by adjusting the stretching and swelling conditions.

In order to achieve the above purposes, the disclosure adopts the following technical solution:

Provided is a method for preparing a hollow fiber membrane by melt spinning-stretching and selective swelling, including:
1) preparing a nascent hollow fiber by melt spinning in an inert gas protective atmosphere by using an amphiphilic block copolymer as a film forming material, and stretching the nascent hollow fiber in the cooling process, a stretch rate being controlled at 200-540 mm/min, and a stretch ratio being controlled at 150-600%;
2) immersing the hollow fiber obtained in step 1) in a swelling solvent, and treating the hollow fiber in a water bath at 65° C. for 1 h; and then transferring the hollow fiber into a long-chain alkane solvent, treating the hollow fiber at the same temperature for 1-12 h, and after the completion of the treatment, immediately taking out the hollow fiber and drying the hollow fiber to obtain the hollow fiber membrane with a bicontinuous porous structure.

In the solution of the disclosure, the amphiphilic block copolymer in step 1) is composed of block A and block B (A-B). The block A is selected from any one of polysulfone (PSF), polyethersulfone (PES), polyphenylsulfone (PPSU) and polylactic acid (PLA), the block B is selected from any one of polyethylene glycol (PEG) and polyethylene oxide (PEO), and the amphiphilic block copolymer has a total molecular weight of 50-200 kDa. Preferably, the block A is polysulfone (PSF), and the block B is polyethylene glycol (PEG).

In a further preferred solution of the disclosure, the amphiphilic block copolymer and molecular weight thereof is selected from any one of $PSF_{75}$-$PEG_{20}$, $PES_{73}$-$PEG_{19}$, $PPSU_{78}$-$PEG_{22}$ and $PLA_{75}$-$PEO_{21}$, in kDa.

In the solution of the disclosure, the process of the melt spinning in step 1) includes melting the solid amphiphilic block copolymer and then extruding the melted amphiphilic block copolymer with a single-screw or twin-screw extruder through a spinneret to obtain the hollow fiber.

In a more preferred solution of the disclosure, the solid amphiphilic block copolymer is melted at a temperature of 100-250° C., further preferably at a temperature of 200-210° C.

In the solution of the disclosure, in the melting process in step 1), an inert protective gas such as nitrogen or helium is used to prevent the block copolymer from being oxidized or degraded.

In the solution of the disclosure, the cooling process in step 1) is as follows: cooling the nascent hollow fiber membrane by water cooling, air cooling or natural cooling after it obtained through the spinneret.

In a preferred solution of the disclosure, in the stretching of the nascent hollow fiber in the cooling process in step 1), the stretch rate is controlled at 250-500 mm/min, and the stretch ratio is controlled at 300-550%.

In the solution of the disclosure, the swelling solvent in step 2) is a mixed solvent composed of n-propanol and a polar solvent. The polar solvent accounts for 0-50 wt % of the mixed solvent. More preferably, the polar solvent accounts for 10 wt %-25 wt % of the mixed solvent. The polar solvent is further preferably selected from any one of acetone, tetrahydrofuran or toluene, i.e., the swelling solvent is a mixed solvent of n-propanol and acetone, a mixed solvent of n-propanol and tetrahydrofuran, or a mixed solvent of n-propanol and toluene. Most preferably, the swelling solvent is an n-propanol/acetone mixed solvent containing 20 wt % of acetone, an n-propanol/tetrahydrofuran mixed solvent containing 20 wt % of tetrahydrofuran, or an n-propanol/toluene mixed solvent containing 10 wt % of toluene.

In the solution of the disclosure, the long-chain alkane solvent in step 2) is preferably any one or a mixture of two or more of n-pentane, n-hexane, n-heptane, n-octane, n-nonane and n-decane, most preferably n-heptane.

In the solution of the disclosure, the treatment in the long-chain alkanesolvent in step 2) is carried out for 1-12 h, preferably 1 h, 6 h or 12 h.

In a preferred embodiment of the disclosure, the method specifically includes the following steps:
1) Melt Spinning-Stretching Process
melting a solid block copolymer by heating at high temperature to obtain a molten polymer, extruding the molten polymer with a single-screw or twin-screw extruder through a spinneret in an inert gas protective atmosphere to obtain a nascent hollow fiber, and stretching the nascent hollow fiber in the cooling process, a stretch rate being controlled at 250-500 mm/min, and a stretch ratio being controlled at 300-550%; where the amphiphilic block copolymer is composed of block A and block B (A-B), where the block A is selected from polysulfone (PSF), and the block B is selected from any one of polyethylene glycol (PEG) and polyethylene oxide (PEO); the block B accounts for 10-40% of the total mass of the amphiphilic block copolymer; the amphiphilic block copolymer has a total molecular weight of 50-200 kDa; and 2) Pore Forming Process by Selective Swelling placing the amphiphilic block copolymer hollow fiber obtained in step 1) in a container filled with a swelling solvent, treating the hollow fiber in a water bath at 65° C. for 1 h to form a porous structure, then transferring the hollow fiber into a long-chain alkane solvent and treating the hollow fiber for 1-12 h, and finally, drying the hollow fiber to obtain the amphiphilic block copolymer hollow fiber membrane with a bicontinuous porous structure.

Compared with the prior art, the disclosure has the following beneficial technical effects:

(1) The combination of the melt spinning-stretching and the selective swelling overcomes the trade-off between permeance and rejection, i.e., with the increase of stretching degree, the permeance of the hollow fiber membrane increases, but the rejection decreases.

In the prior art, when the hollow fiber membrane is prepared by MSCS, TIPS or NIPS in combination with the stretching process, the hollow fiber membrane exhibits an increase in permeance and a decrease in rejection, which may even affect the subsequent application of the hollow fiber membrane. In the disclosure, by combining the melt spinning-stretching and the selective swelling, the permeance and the rejection of the hollow fiber membrane can be synchronously increased as the stretch ratio increases within a specific range, and the change in performance can be adjusted continuously.

(2) The treatment in the long-chain alkane solvent can make the polar chain excessively enriched on the surface of the membrane migrate inward, thereby improving the performance of the hollow fiber membrane.

The polar chain (such as PEG) may migrate to the surface of the membrane in the swelling process due to its extremely high activity. However, this excessive enrichment may lead to a dense layer on the surface of the membrane, causing a decrease in the performance of the membrane. Through the treatment with the long-chain alkane solvent capable of inhibiting the polar chain, the polar chain can migrate inward, thereby avoiding the dense layer and improving the performance of the hollow fiber membrane.

In conclusion, the disclosure establishes a simple and effective method that can effectively improve the performance of hollow fiber membrane by combining melt spinning stretching and selective swelling, and with the increase of stretching ratio, the permeance and rejection of the hollow fiber membrane can be improved synchronously.

DETAILED DESCRIPTION OF EMBODIMENTS

The disclosure will be further explained with reference to the following examples. The following examples are merely intended to illustrate the disclosure, but not intended to limit the implementation scope of the disclosure.

Example 1

20 g of $PSF_{75}$-$PEG_{20}$ block copolymer was added to a twin-screw extruder, melted at 200/210° C. in a nitrogen protective atmosphere, then extruded through a spinneret at 200° C., and stretched under water cooling while controlling a stretch rate at 260 mm/min, thereby obtaining a hollow fiber with a stretch ratio of 247%. The obtained hollow fiber was immersed in an n-propanol/acetone mixed solvent containing 20 wt % of acetone, treated in a water bath at 65° C. for 1 h, then transferred into n-octane and treated for 12 h. After the completion of the treatment, the hollow fiber was immediately taken out, and dried at 40° C. to obtain the hollow fiber membrane.

The polysulfone/polyethylene glycol hollow fiber membrane obtained in this example had a pure water permeance of about 84 $L·m^{-2}·h^{-1}·bar^{-1}$, and a rejection for bovine serum albumin with a diameter of about 6 nm of about 60%.

Example 2

20 g of $PSF_{75}$-$PEG_{20}$ block copolymer was added to a twin-screw extruder, melted at 200/210° C. in a nitrogen protective atmosphere, then extruded through a spinneret at 200° C., and stretched under natural cooling while controlling a stretch rate at 360 mm/min, thereby obtaining a hollow fiber with a stretch ratio of 380%. The obtained hollow fiber was immersed in an n-propanol/acetone mixed solvent containing 20 wt % of acetone, treated in a water bath at 65° C. for 1 h, then transferred into n-heptane and treated for 6 h. After the completion of the treatment, the hollow fiber was immediately taken out, and dried at 40° C. to obtain the hollow fiber membrane.

The polysulfone/polyethylene glycol hollow fiber membrane obtained in this example had a pure water permeance of about 89 $L·m^{-2}·h^{-1}·bar^{-1}$, and a rejection for bovine serum albumin with a diameter of about 6 nm of about 68%.

Example 3

20 g of $PSF_{75}$-$PEG_{20}$ block copolymer was added to a twin-screw extruder, melted at 200/210° C. in a nitrogen protective atmosphere, then extruded through a spinneret at 200° C., and stretched under natural cooling while controlling a stretch rate at 470 mm/min, thereby obtaining a hollow fiber with a stretch ratio of 527%. The obtained hollow fiber was immersed in an n-propanol/acetone mixed solvent containing 20 wt % of acetone, treated in a water bath at 65° C. for 1 h, then transferred into n-heptane and treated for 1 h. After the completion of the treatment, the hollow fiber was immediately taken out, and dried at 40° C. to obtain the hollow fiber membrane.

Figure 1:
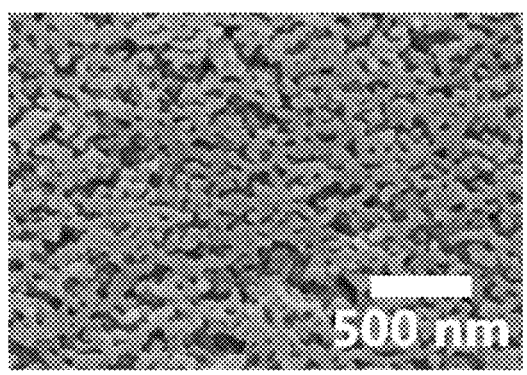
FIG. 1 is an SEM image showing a porous structure of the outer surface of a block copolymer hollow fiber membrane obtained in Example 3.
Figure 2:
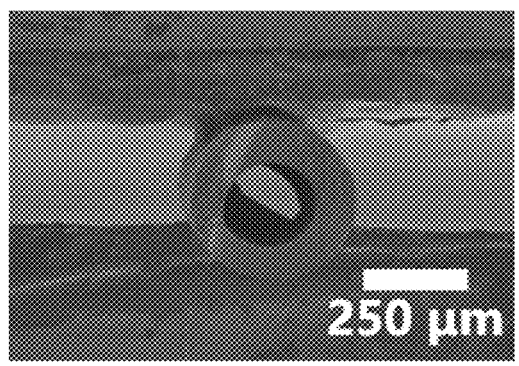
FIG. 2 is an SEM image showing a structure of the cross section of the block copolymer hollow fiber membrane obtained in Example 3.

FIG. 1 and FIG. 2 are SEM images respectively showing the outer surface and the cross section of the polysulfone/polyethylene glycol hollow fiber membrane obtained in this example. As can be seen, the polysulfone/polyethylene glycol hollow fiber membrane obtained after high speed stretching had a good porous structure, and the pores were stretched crosswise significantly and had a small size. The polysulfone/polyethylene glycol membrane obtained after high-speed stretching and swelling had a wall thickness of about 413 μm, which was much smaller than that obtained after low-speed stretching as in Comparative Example 1.

The polysulfone/polyethylene glycol hollow fiber membrane obtained in this example had a pure water permeance of about 94 $L·m^{-2}·h^{-1}·bar^{-1}$, and a rejection for bovine serum albumin with a diameter of about 6 nm of about 78%.

Example 4

20 g of $PES_{73}$-$PEG_{19}$ block copolymer was added to a twin-screw extruder, melted at 200/210° C. in a nitrogen protective atmosphere, then extruded through a spinneret at 200° C., and stretched under natural cooling while controlling a stretch rate at 470 mm/min, thereby obtaining a hollow fiber with a stretch ratio of 506%. The obtained hollow fiber was immersed in an n-propanol/acetone mixed solvent containing 20 wt % of acetone, treated in a water bath at 65° C. for 1 h, then transferred into n-heptane and treated for 1 h. After the completion of the treatment, the hollow fiber was immediately taken out, and dried at 40° C. to obtain the hollow fiber membrane.

The polyethersulfone/polyethylene glycol hollow fiber membrane obtained in this example had a pure water permeance of about 85 $L·m^{-2}·h^{-1}·bar^{-1}$, and a rejection for bovine serum albumin with a diameter of about 6 nm of about 82%.

Example 5

20 g of $PPSU_{78}$-$PEG_{22}$ block copolymer was added to a twin-screw extruder, melted at 220/230° C. in a nitrogen protective atmosphere, then extruded through a spinneret at 220° C., and stretched under natural cooling while controlling a stretch rate at 470 mm/min, thereby obtaining a hollow fiber with a stretch ratio of 540%. The obtained hollow fiber was immersed in an n-propanol/toluene mixed solvent containing 10 wt % of toluene, treated in a water bath at 65° C. for 1 h, then transferred into n-heptane and treated for 1 h. After the completion of the treatment, the hollow fiber was immediately taken out, and dried at 40° C. to obtain the hollow fiber membrane.

The polyphenylsulfone/polyethylene glycol hollow fiber membrane obtained in this example had a pure water permeance of about 80 $L·m^{-2}·h^{-1}·bar^{-1}$, and a rejection for bovine serum albumin with a diameter of about 6 nm of about 77%.

Example 6

20 g of $PLA_{75}$-$PEO_{21}$ block copolymer was added to a twin-screw extruder, melted at 130/140° C. in a nitrogen protective atmosphere, then extruded through a spinneret at 130° C., and stretched under natural cooling while controlling a stretch rate at 470 mm/min, thereby obtaining a hollow fiber with a stretch ratio of 550%. The obtained hollow fiber was immersed in an n-propanol/tetrahydrofuran mixed solvent containing 20 wt % of tetrahydrofuran, treated in a water bath at 65° C. for 1 h, then transferred into n-heptane and treated for 1 h. After the completion of the treatment, the hollow fiber was immediately taken out, and dried at 40° C. to obtain the hollow fiber membrane.

The polylactic acid/polyethylene oxide hollow fiber membrane obtained in this example had a pure water permeance of about 103 $L·m^{-2}·h^{-1}·bar^{-1}$, and a rejection for bovine serum albumin with a diameter of about 6 nm of about 75%.

Comparative Example 1

The hollow fiber membrane was prepared with reference to the method in Example 3, but with a lower stretch rate and a lower stretch ratio. The specific solution is as follows:

20 g of $PSF_{75}$-$PEG_{20}$ block copolymer was added to a twin-screw extruder, melted at 200/210° C. in a nitrogen protective atmosphere, then extruded through a spinneret at 200° C., and stretched under natural cooling while controlling a stretch rate at 85 mm/min, thereby obtaining a hollow fiber with a stretch ratio of 13%. The obtained hollow fiber was immersed in an n-propanol/acetone mixed solvent containing 20 wt % of acetone, treated in a water bath at 65° C. for 1 h, then transferred into n-heptane and treated for 1 h. After the completion of the treatment, the hollow fiber was immediately taken out, and dried at 40° C. to obtain the hollow fiber membrane.

Figure 3:
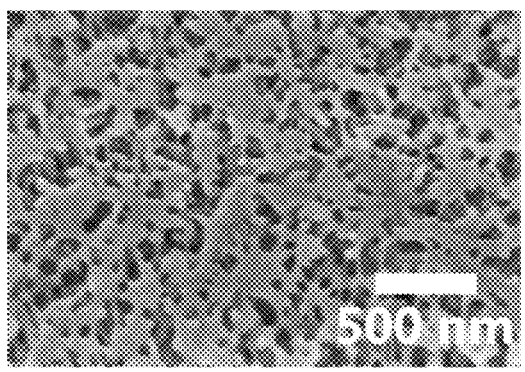
FIG. 3 is an SEM image showing a porous structure of the cross section of a block copolymer hollow fiber membrane obtained in Comparative Example 1.
Figure 4:
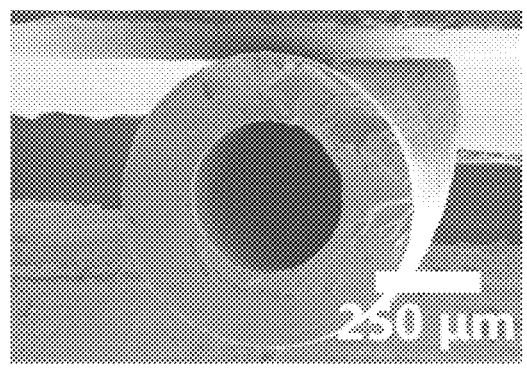
FIG. 4 is an SEM image showing a structure of the cross section of the block copolymer hollow fiber membrane obtained in Comparative Example 1.

FIG. 3 and FIG. 4 are SEM images respectively showing the outer surface and the cross section of the polysulfone/polyethylene glycol hollow fiber membrane obtained in this comparative example. As can be seen, the polysulfone/polyethylene glycol hollow fiber membrane obtained after low-speed stretching had a large area where no pores were formed, and the pores were not stretched significantly and had a large size. The polysulfone/polyethylene glycol membrane obtained after low-speed stretching and swelling had a wall thickness of about 700 μm, which was much larger than that obtained after high-speed stretching as in Example 3.

The polysulfone/polyethylene glycol hollow fiber membrane obtained in this comparative example had a pure water permeance of about 49 $L·m^{-2}·h^{-1}·bar^{-1}$, and a rejection for bovine serum albumin with a diameter of about 6 nm of about 37%.

As can be seen, in the case that the same raw material and the same swelling method were used, when the stretch rate and the stretch ratio were excessively low, the hollow fiber could not obtain the ideal structure, permeance and rejection.

Comparative Example 2

The hollow fiber membrane was prepared with reference to the method in Example 3, but with a lower stretch rate and a lower stretch ratio. The specific solution is as follows:

20 g of $PSF_{75}$-$PEG_{20}$ block copolymer was added to a twin-screw extruder, melted at 200/210° C. in a nitrogen protective atmosphere, then extruded through a spinneret at 200° C., and stretched under air cooling while controlling a stretch rate at 150 mm/min, thereby obtaining a hollow fiber with a stretch ratio of 100%. The obtained hollow fiber was immersed in an n-propanol/acetone mixed solvent containing 20 wt % of acetone, treated in a water bath at 65° C. for 1 h, then transferred into n-heptane and treated for 1 h. After the completion of the treatment, the hollow fiber was immediately taken out, and dried at 40° C. to obtain the hollow fiber membrane.

The polysulfone/polyethylene glycol hollow fiber membrane obtained in this comparative example had a pure water permeance of about 68 $L \cdot m^{-2} \cdot h^{-1} \cdot bar^{-1}$, and a rejection for bovine serum albumin with a diameter of about 6 nm of about 54%.

As can be seen, in the case that the same raw material and the same swelling method were used, when the stretch rate and the stretch ratio were lower, the hollow fiber could not obtain the ideal permeance and rejection.

Comparative Example 3

The hollow fiber membrane was prepared with reference to the method in Example 3, but with an excessively high stretch rate and an excessively high stretch ratio. The specific solution is as follows:

20 g of $PSF_{75}$-$PEG_{20}$ block copolymer was added to a twin-screw extruder, melted at 200/210° C. in a nitrogen protective atmosphere, then extruded through a spinneret at 200° C., and stretched under air cooling while controlling a stretch rate at 550 mm/min, thereby obtaining a hollow fiber with a stretch ratio of 633%. The obtained hollow fiber was immersed in an n-propanol/acetone mixed solvent containing 20 wt % of acetone, treated in a water bath at 65° C. for 1 h, then transferred into n-heptane and treated for 1 h. After the completion of the treatment, the hollow fiber was immediately taken out, and dried at 40° C. to obtain the hollow fiber membrane.

The polysulfone/polyethylene glycol hollow fiber membrane obtained in this comparative example had a pure water permeance of about 68.3 $L \cdot m^{-2} \cdot h^{-1} \cdot bar^{-1}$, and a rejection for bovine serum albumin with a diameter of about 6 nm of about 66.3%.

As can be seen, in the case that the same raw material and the same swelling method were used, when the stretch rate and the stretch ratio were excessively high, the hollow fiber exhibited a decrease in both permeance and rejection.

Comparative Example 4

The hollow fiber membrane was prepared with reference to the method in Example 3, but without the treatment in the long-chain alkane solvent after the swelling. The specific solution is as follows:

20 g of $PSF_{75}$-$PEG_{20}$ block copolymer was added to a twin-screw extruder, melted at 200/210° C. in a nitrogen protective atmosphere, then extruded through a spinneret at 200° C., and stretched under natural cooling while controlling a stretch rate at 470 mm/min, thereby obtaining a hollow fiber with a stretch ratio of 527%. The obtained hollow fiber was immersed in an n-propanol/acetone mixed solvent containing 20 wt % of acetone, and treated in a water bath at 65° C. for 1 h. After the completion of the swelling, the hollow fiber was immediately taken out, and dried at 40° C. to obtain the hollow fiber membrane.

The obtained polysulfone/polyethylene glycol hollow fiber membrane had a pure water permeance of about 10 $L \cdot m^{-2} \cdot h^{-1} \cdot bar^{-1}$, and a rejection for bovine serum albumin with a diameter of about 6 nm of about 75%.

Compared with Example 3, in the case that the same raw material, the same stretch rate and the same swelling method were used, when the treatment in the long-chain alkane solvent was not carried out after the swelling, the hollow fiber membrane still had a very high rejection, but exhibited a significant decrease in permeance.

Comparative Example 5

The hollow fiber membrane was prepared by using a mixture of polyvinyl butyral and polyethylene glycol (non-amphiphilic block copolymer) as the raw material, the melt spinning and stretching conditions were also different, and after the stretching, neither swelling nor treatment in long-chain alkanesolvent was carried out. The specific solution is as follows:

20 g of mixture of polyvinyl butyral and polyethylene glycol (the mass fraction of the polyvinyl butyral was 20 wt %) was added to a twin-screw extruder, melted and uniformly mixed at 180° C. in a nitrogen protective atmosphere, and then extruded through a spinneret at 160° C. Water cooling was carried out to induce phase separation and solidification, and then stretching was carried out at a stretch rate of 112 mm/min, thereby obtaining the hollow fiber membrane.

The polyvinyl butyral hollow fiber membrane obtained at the stretch rate of 112 mm/min had a pure water permeance of about 3.3 $L \cdot m^{-2} \cdot h^{-1} \cdot bar^{-1}$, and a rejection for monodisperse polystyrene latex particles with a diameter of 102 nm of about 93.2%.

Compared with the examples in the disclosure, the hollow fiber membrane, which was obtained not by using the amphiphilic block copolymer of the disclosure as the raw material and by stretching the membrane formed by phase inversion rather than by swelling and treatment in long-chain alkanesolvent, had a very poor permeance.

Comparative Example 6

The hollow fiber membrane was prepared by using a mixture of polyvinyl butyral and polyethylene glycol (non-amphiphilic block copolymer) as the raw material, the melt spinning and stretching conditions were also different, and after the stretching, neither swelling nor treatment in long-chain alkanesolvent was carried out. The specific solution is as follows:

20 g of mixture of polyvinyl butyral and polyethylene glycol (the mass fraction of the polyvinyl butyral was 20 wt %) was added to a twin-screw extruder, melted and uniformly mixed at 180° C. in a nitrogen protective atmosphere, and then extruded through a spinneret at 160° C. Water cooling was carried out to induce phase separation and solidification, and then stretching was carried out at a stretch rate of 225 mm/min, thereby obtaining the hollow fiber membrane.

The polyvinyl butyral hollow fiber membrane obtained at the stretch rate of 225 mm/min had a pure water permeance of about 11.4 $L \cdot m^{-2} \cdot h^{-1} \cdot bar^{-1}$, and a rejection for monodisperse polystyrene latex particles with a diameter of 102 nm of about 52.1%.

Compared with Comparative Example 5, for the treatment of the hollow fiber of the same raw material, after simply increasing the stretch rate, only the permeance increased, but the rejection decreased significantly.

Compared with Examples 1 and 2, in the case that the membrane formation method was different, stretching the hollow fiber membrane prepared by phase inversion could not ensure the rejection performance of the membrane if the permeance was to be increased.

Based on the above, as can be seen from the examples and comparative examples, according to the solution of the disclosure, if the appropriate amphiphilic block copolymer is selected and melt-spun, the obtained hollow fiber is stretched at a specific rate and selective swelling and treatment in long-chain alkanesolvent after swelling are used, the hollow fiber membrane with ideal permeance and rejection can be obtained.

The invention claimed is:

1. A method for preparing a hollow fiber membrane by melt spinning-stretching and selective swelling, comprising:
   1) preparing a nascent hollow fiber by melt spinning in an inert gas protective atmosphere by using an amphiphilic block copolymer as a film forming material, and stretching the nascent hollow fiber in a cooling process, a stretch rate being controlled at 250-500 mm/min, and a stretch ratio being controlled at 300-550%; the amphiphilic block copolymer in 1) is composed of block A and block B (A-B), wherein the block A is selected from any one of polysulfone (PSF), polyethersulfone (PES), polyphenylsulfone (PPSU) and polylactic acid (PLA), the block B is selected from any one of polyethylene glycol (PEG) and polyethylene oxide (PEO), and the amphiphilic block copolymer has a total molecular weight of 50-200 kDa;
   2) immersing the hollow fiber obtained in 1) in a swelling solvent, and treating the hollow fiber in a water bath at 65° C. for 1 h; and then transferring the hollow fiber into a long-chain alkane solvent, treating the hollow fiber at 65° C. for 1-12 h, and after the treating the hollow fiber at 65° C. for 1-12 h, immediately taking out the hollow fiber and drying the hollow fiber to obtain the hollow fiber membrane with a bicontinuous porous structure, wherein
      the long-chain alkane solvent in 2) is any one or a mixture of two or more of n-pentane, n-hexane, n-heptane, n-octane, n-nonane and n-decane.

2. The method according to claim 1, wherein the block A is polysulfone (PSF), and the block B is polyethylene glycol (PEG).

3. The method according to claim 2, wherein the amphiphilic block copolymer and molecular weight thereof is selected from any one of $PSF_{75}$-$PEG_{20}$, $PES_{73}$-$PEG_{19}$, $PPSU_{78}$-$PEG_{22}$ and $PLA_{75}$-$PEO_{21}$, in kDa.

4. The method according to claim 1, wherein the process of the melt spinning in 1) includes melting a solid amphiphilic block copolymer and then extruding the melted amphiphilic block copolymer with a single-screw or twin-screw extruder through a spinneret to obtain the hollow fiber.

5. The method according to claim 4, wherein the solid amphiphilic block copolymer is melted at a temperature of 100-250° C.

6. The method according to claim 4, wherein the solid amphiphilic block copolymer is melted at a temperature of 200-210° C.

7. The method according to claim 4, wherein in the melting, an inert protective gas, comprising nitrogen or helium, is used to prevent the amphiphilic block copolymer from being oxidized or degraded.

8. The method according to claim 1, wherein the cooling process in 1) is as follows: cooling the nascent hollow fiber membrane by water cooling, air cooling or natural cooling after being obtained through a spinneret.

9. The method according to claim 1, wherein the swelling solvent in 2) is a mixed solvent composed of n-propanol and a polar solvent, and the polar solvent accounts for 0-50 wt % of the mixed solvent.

10. The method according to claim 9, wherein the polar solvent accounts for 10 wt %-25 wt % of the mixed solvent.

11. The method according to claim 9, wherein the polar solvent is selected from any one of acetone, tetrahydrofuran or toluene.

12. The method according to claim 9, wherein the swelling solvent is an n-propanol/acetone mixed solvent containing 20 wt % of acetone, an n-propanol/tetrahydrofuran mixed solvent containing 20 wt % of tetrahydrofuran, or an n-propanol/toluene mixed solvent containing 10 wt % of toluene.

13. The method according to claim 1, wherein the long-chain alkane solvent in 2) is n-heptane.

14. The method according to claim 1, wherein the treatment in the long-chain alkane solvent in 2) is carried out for 1 h, 6 h or 12 h.

15. A method for preparing a hollow fiber membrane by melt spinning-stretching and selective swelling, specifically comprising the following:
   1) melt spinning-stretching process comprising
      melting a solid amphiphilic block copolymer by heating at a temperature of 100-250° C. to obtain a molten polymer, extruding the molten polymer with a single-screw or twin-screw extruder through a spinneret in an inert gas protective atmosphere to obtain a nascent hollow fiber, and stretching the nascent hollow fiber in a cooling process, a stretch rate being controlled at 250-500 mm/min, and a stretch ratio being controlled at 300-550%; wherein the solid amphiphilic block copolymer is composed of block A and block B (A-B), wherein the block A is selected from polysulfone (PSF), and the block B is selected from any one of polyethylene glycol (PEG) and polyethylene oxide (PEO); the block B accounts for 10-40% of the total mass of the solid amphiphilic block copolymer; the solid amphiphilic block copolymer has a total molecular weight of 50-200 kDa; and
   2) pore forming process by selective swelling comprising
      placing the amphiphilic block copolymer hollow fiber obtained in 1) in a container filled with a swelling solvent, treating the hollow fiber in a water bath at 65° C. for 1 h to form a porous structure, then transferring the hollow fiber into a long-chain alkane solvent and treating the hollow fiber for 1-12 h, and finally, drying the hollow fiber to obtain the hollow fiber membrane with a bicontinuous porous structure, wherein
      the long-chain alkane solvent in 2) is any one or a mixture of two or more of n-pentane, n-hexane, n-heptane, n-octane, n-nonane and n-decane.

* * * * *